(12) United States Patent
Shields

(10) Patent No.: US 11,039,671 B2
(45) Date of Patent: Jun. 22, 2021

(54) CURRENCY AND CREDIT CARD HOLDER WITH SECURITY SYSTEM

(71) Applicant: Michael Peter Shields, Santa Barbara, CA (US)

(72) Inventor: Michael Peter Shields, Santa Barbara, CA (US)

(73) Assignee: TODO BIO, S.A.

( * ) Notice: Subject to any disclaimer, the term of this patent is extended or adjusted under 35 U.S.C. 154(b) by 333 days.

(21) Appl. No.: 16/125,482

(22) Filed: Sep. 7, 2018

(65) Prior Publication Data

US 2019/0075901 A1    Mar. 14, 2019

Related U.S. Application Data

(60) Provisional application No. 62/669,281, filed on May 9, 2018, provisional application No. 62/559,785, filed on Sep. 18, 2017, provisional application No. 62/557,261, filed on Sep. 12, 2017.

(51) Int. Cl.
| | |
|---|---|
| *A45C 11/18* | (2006.01) |
| *A45C 1/06* | (2006.01) |
| *H04W 4/80* | (2018.01) |
| *A45C 11/00* | (2006.01) |

(52) U.S. Cl.
CPC .............. *A45C 11/182* (2013.01); *A45C 1/06* (2013.01); *H04W 4/80* (2018.02); *A45C 2001/065* (2013.01); *A45C 2001/067* (2013.01); *A45C 2011/002* (2013.01); *A45C 2011/186* (2013.01); *A45C 2200/15* (2013.01)

(58) Field of Classification Search
CPC ... A45C 11/182; A45C 1/06; A45C 2001/065; A45C 2011/002; A45C 2001/062; A45C 2001/067; A45C 2011/186; A45C 15/08; A45C 13/007; H04W 4/80
USPC ......................................................... 150/147
See application file for complete search history.

(56) References Cited

U.S. PATENT DOCUMENTS

| | | | | |
|---|---|---|---|---|
| 4,682,310 A | * | 7/1987 | Lund ................... | G04B 47/02 150/131 |
| 5,082,422 A | | 1/1992 | Wang | |
| 5,327,749 A | | 7/1994 | Junger | |
| 5,878,874 A | * | 3/1999 | Weggelaar ........... | A45C 11/184 150/147 |
| 6,637,632 B2 | * | 10/2003 | Chiku ................... | B60N 3/101 224/275 |
| 8,567,459 B2 | * | 10/2013 | Kitchen ............... | A45C 11/182 150/147 |
| 2004/0216825 A1 | * | 11/2004 | Radochonski ......... | A45C 15/08 150/106 |
| 2006/0201594 A1 | * | 9/2006 | Carmichael .............. | A45C 1/04 150/143 |
| 2013/0061990 A1 | * | 3/2013 | Syma ................... | A45C 11/182 150/137 |

(Continued)

FOREIGN PATENT DOCUMENTS

| | | |
|---|---|---|
| WO | WO2013095434 A1 | 6/2013 |
| WO | WO2015064799 A1 | 5/2015 |

*Primary Examiner* — Sue A Weaver
(74) *Attorney, Agent, or Firm* — Paul D. Chancellor; Ocean Law

(57) ABSTRACT

A pocketable device comprises a mechanical assembly for holding bills and credit cards, the mechanical assembly including a latch plate or upper jaw and a spring plate or lower jaw.

15 Claims, 14 Drawing Sheets

(56) References Cited

U.S. PATENT DOCUMENTS

| | | | |
|---|---|---|---|
| 2013/0104350 A1* | 5/2013 | Vlasdeck | A45C 1/06 24/489 |
| 2013/0135103 A1* | 5/2013 | Hollaway | A45C 1/06 340/568.7 |
| 2014/0013551 A1* | 1/2014 | Thomson | A45C 1/06 24/499 |
| 2014/0096880 A1* | 4/2014 | Yeung | A45C 11/182 150/137 |
| 2014/0223584 A1 | 8/2014 | Cabouli | |
| 2015/0216228 A1* | 8/2015 | Roila | B65D 25/108 206/254 |
| 2016/0098878 A1* | 4/2016 | Cabouli | G06F 21/86 340/5.52 |
| 2016/0206065 A1* | 7/2016 | Ehrlich | H04B 1/3888 |
| 2020/0286070 A1* | 9/2020 | Garrett | G06Q 20/229 |

* cited by examiner

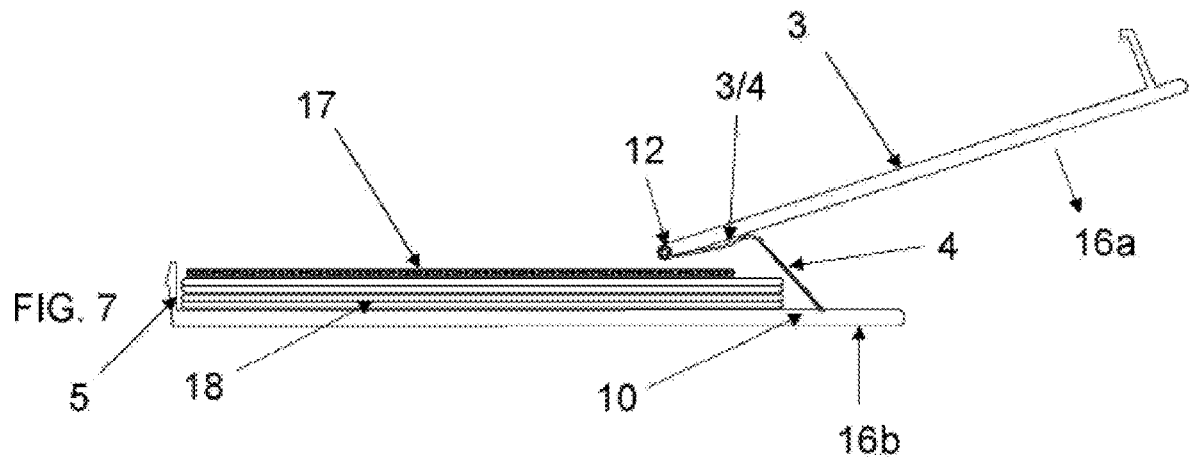
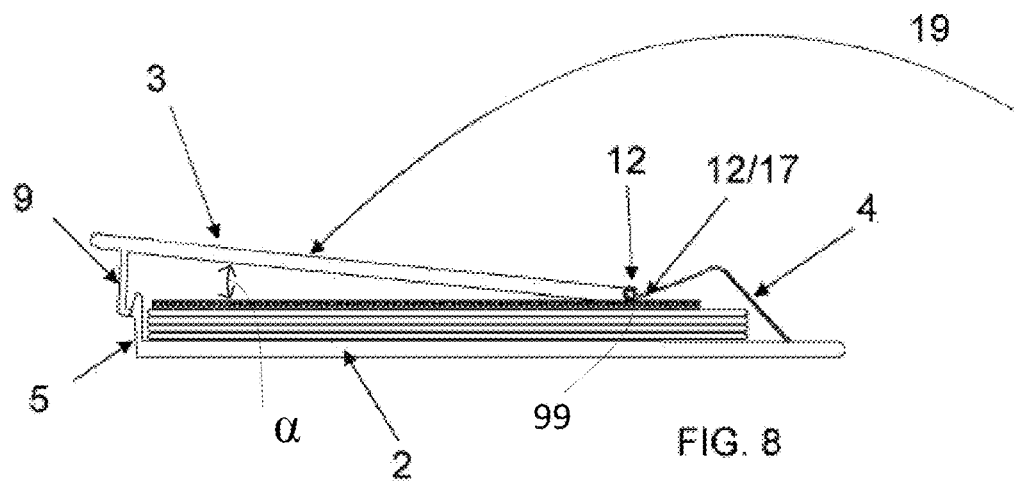
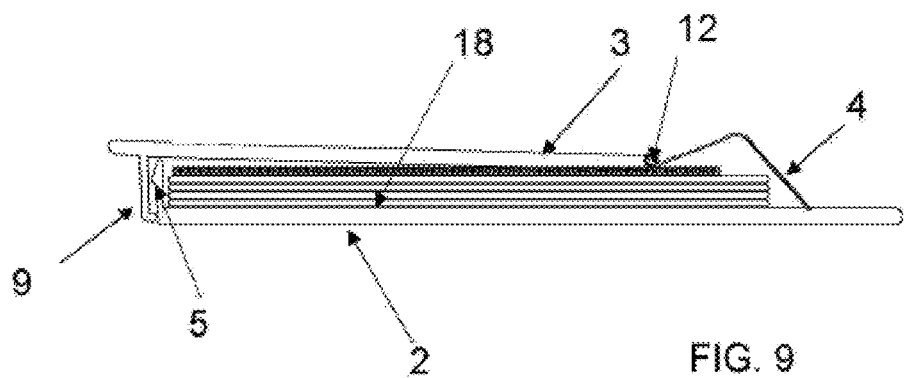

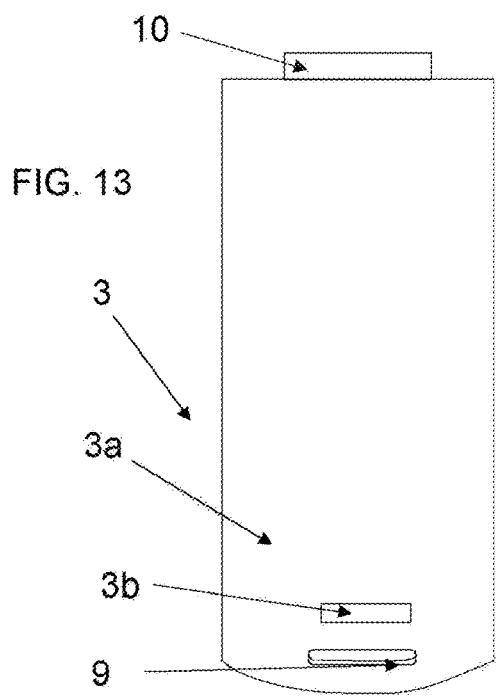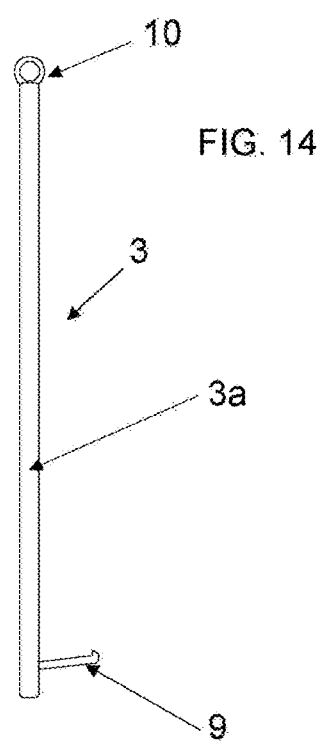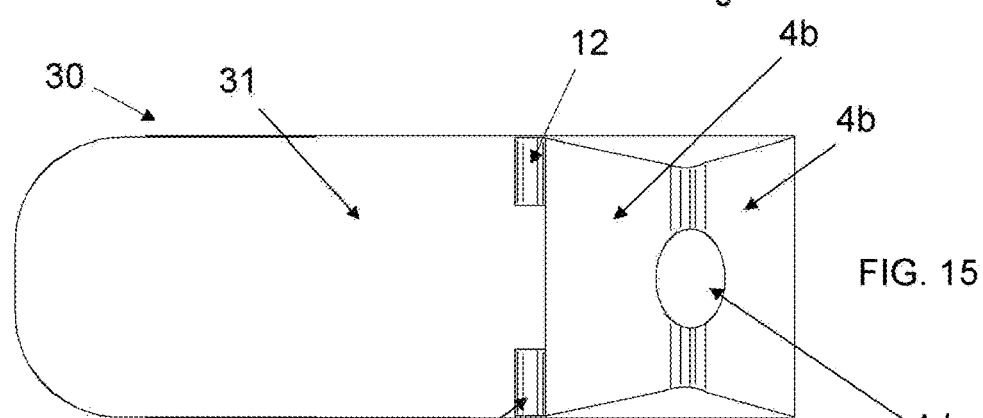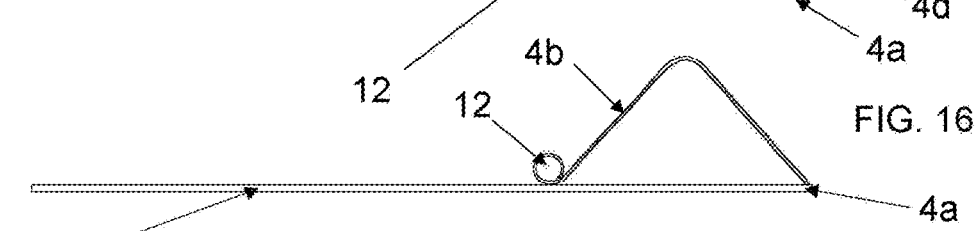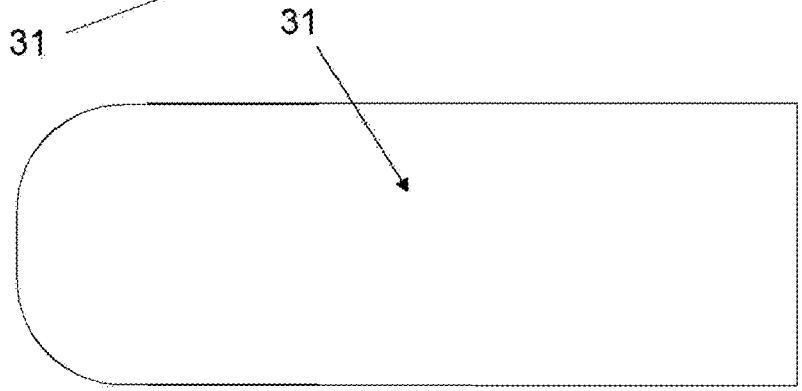

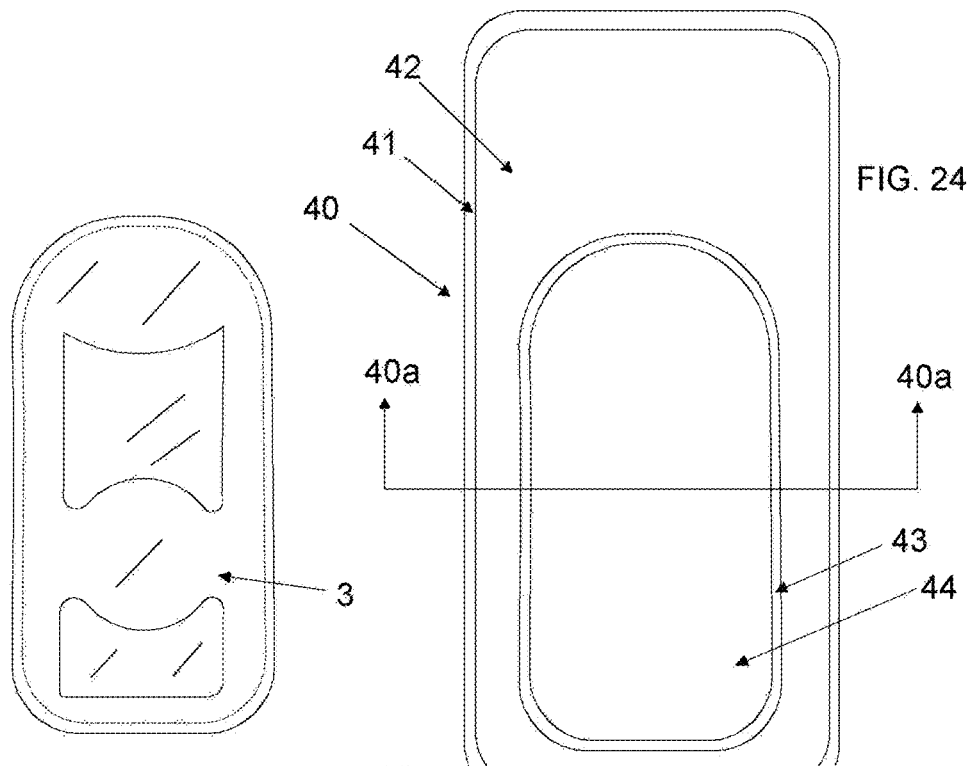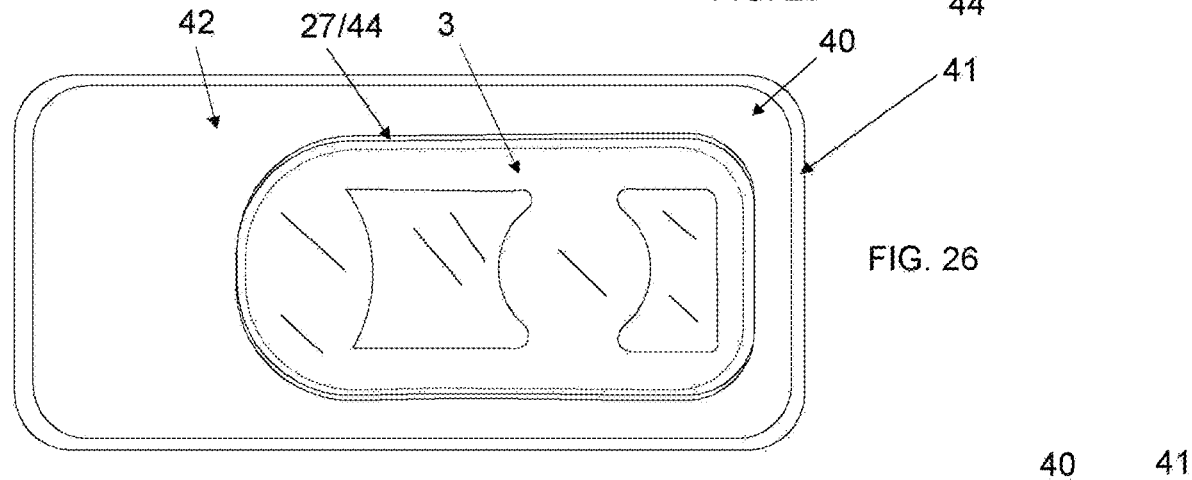

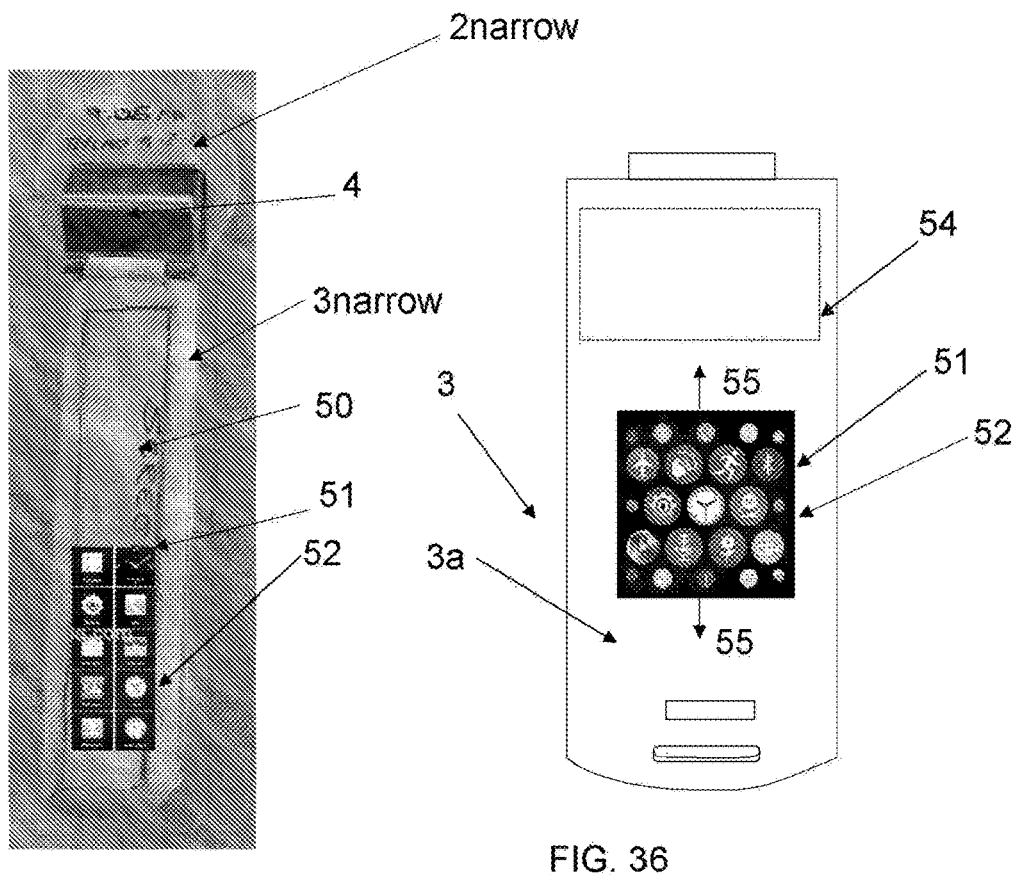
FIG. 35　　FIG. 36
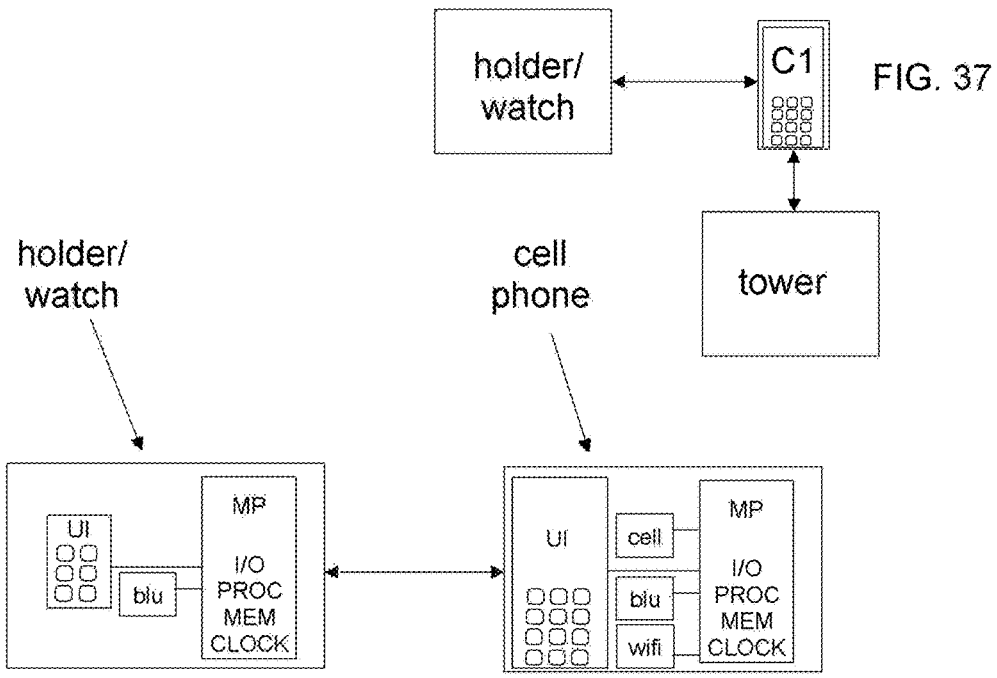
FIG. 37
FIG. 38

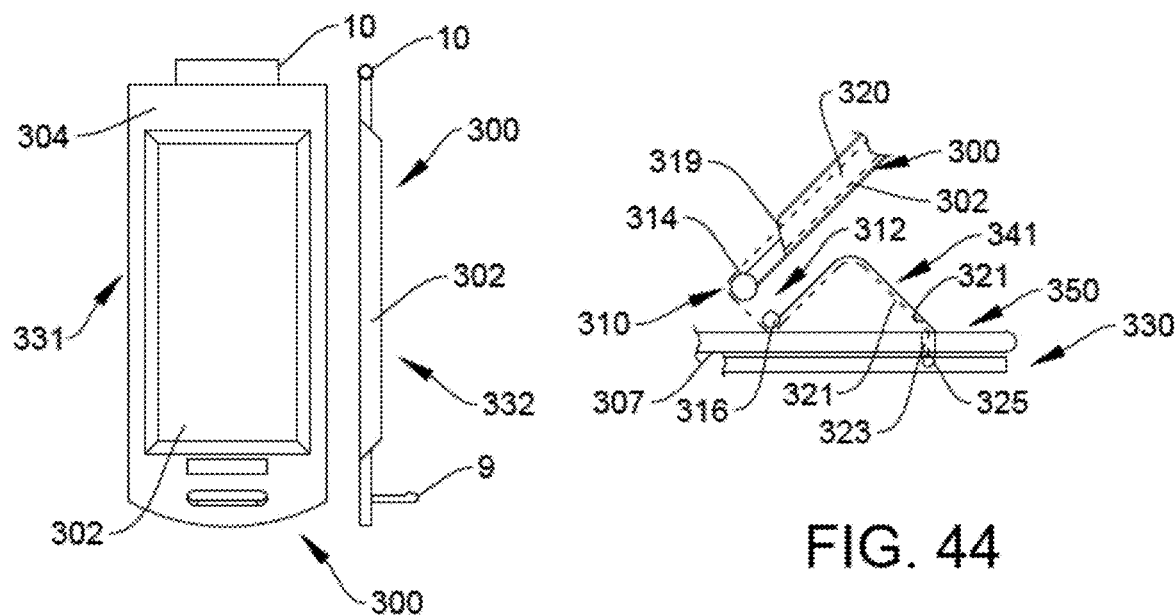
FIG. 42
FIG. 44
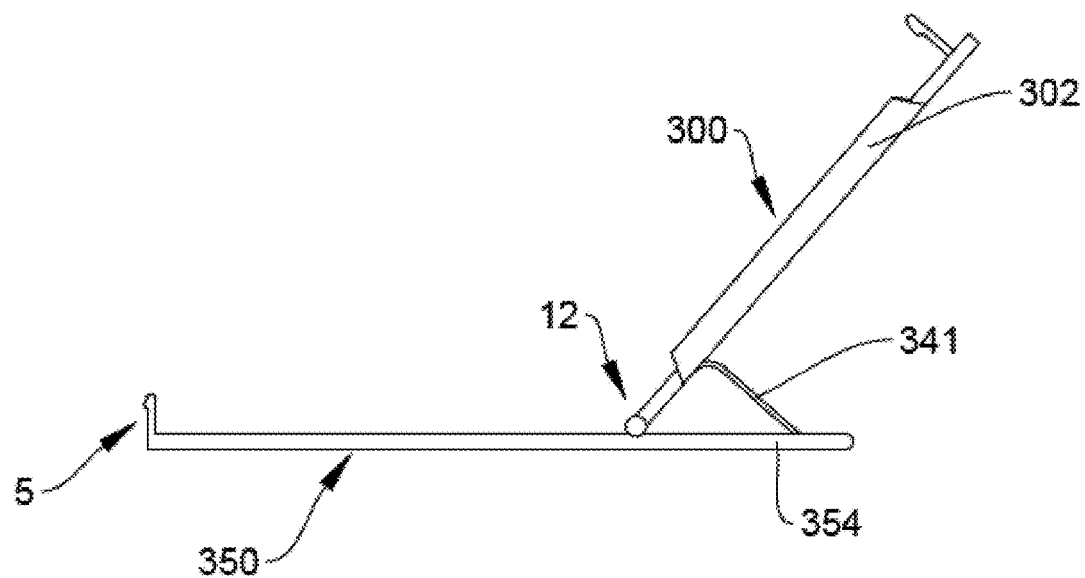
FIG. 43

CURRENCY AND CREDIT CARD HOLDER WITH SECURITY SYSTEM

PRIORITY APPLICATIONS

This application claims priority to provisional patent application Nos. 62/557,261 filed Sep. 12, 2017, 62/559,785 filed Sep. 18, 2107, and 62/669,281 filed May 9, 2018.

FIELD OF THE INVENTION

The present invention is broadly directed to a clip using spring means to securely retain a user's currency and/or credit cards which is or which may be implemented in a pocketable device.

BACKGROUND OF THE INVENTION

For over one hundred years, money clips have been well known in the art. An example is shown in U.S. Pat. No. 1,899,753, showing a simple metal clip capable of engaging dollar bills. The '753 patent discloses a common failure of prior art money clips, i.e., the sole engaging means for bills or credit cards is spring pressure generally provided by a U-shaped metal clip. Agitation or abrasion of the bills or credit cards in such a money clip easily dislodges them from the money clip.

U.S. Pat. No. 6,357,084 attempts to improve the security of the prior art money clips by providing a band that will generally ineffectively gather the bills and credit cards across their lengths. U.S. Pat. No. 7,640,632 continues in that concept with an additional belt across the short sides of gathered credit cards.

As described above, another equally important problem with prior art money clips and credit card holders using a single invariable width between metal parts to provide spring pressure to secure such items. There is a need for a device which is capable of providing a money clip function with a much greater capacity to engage a single credit card or several more with equal security.

Further, money clips in the prior art are of limited functionality, excepting as described in U.S. Pat. No. 4,768, 648 that combines with a simple money clip a calculator.

Various objects and advantages of the present invention will become apparent from the following description taken in conjunction with the accompanying drawings wherein are set forth, by way of illustration and example, certain embodiments of this invention. The drawings submitted herewith constitute a part of this specification, include exemplary embodiments of the present invention, and illustrate various objects and features thereof.

SUMMARY OF THE INVENTION

The present invention is a holder for money and credit cards. Embodiments of the invention provide spring pressure and a capture means to provide dual security for those items. The invention holder has a bottom plate and a latch plate connected by spring means so that the latch plate is hinge connected at a first end to a free, distal end of the V-shaped spring means, where a second end of the latch plate can latch to a distal end of the bottom plate. A proximal end of the V-shaped spring means is non-rotatably fixed to the bottom plate so that an unlatched latch plate can rotate up and onto a top surface of one side of the spring means and cause it to lift from the top surface of the bottom plate by way of mechanical and lever advantage.

In another embodiment of the present invention, the invention holder can be incorporated into a backside of a removable cellular phone case for a typical rectangular touch screen cell phone, so that a user can securely carry their credit cards and bills in the same assembled device as their cell phone.

In yet another embodiment of the present invention, the invention holder's latch plate is formed with a cavity in its top surface into which a housing is fixed, where the housing contains a microprocessor, software, user interface (including a small touchscreen), and wireless communication means to communicate by way of near field communications or Bluetooth standards with a cellular phone of a user, so that this smart watch device incorporated into the latch plate performs functions of the well known smart watches that have similar form factors but secured to a wrist of a user. The invention smart watch device is superior to the wrist-borne devices in that the invention smart watch device is better protected from potential damage and serves the function of both a smart watch and a holder for credit cards and bills.

In yet another embodiment, a pocketable device comprises: a mechanical assembly for holding bills and credit cards; the mechanical assembly including a latch plate or upper jaw and a spring plate or lower jaw, each jaw having a flat, rectangular shape; a "V" shaped spring having a first end affixed to the lower jaw and a second end biased toward the lower jaw; and, the upper jaw having a pinned end rotatably connected to the spring second end and opposite the pinned end a latch end for interengaging a mating latch; wherein bills and cards placed between the upper jaw and lower jaw are compressed between the spring second end and the lower jaw and wherein when latched the upper jaw is free to pivot about the pin such that the upper jaw can move through an angle of less than 10 degrees and when unlatched the upper jaw is free to pivot about the pin through an angle that widens the "V" of the spring.

BRIEF DESCRIPTION OF THE DRAWINGS

FIG. 7 is the holder of FIG. 6 with the latch plate pressed in a spring opening direction so that credit cards and bills can be inserted between a bottom plate and a spring contact.
FIG. 8 is the holder of FIG. 7 with the latch plate released and returned to the partly latched position of FIG. 4.
FIG. 9 is the holder of FIG. 8 with the latch plate returned to the fully closed position of FIG. 1.
FIGS. 13 and 14 are respectively top and side views of the latch plate of the invention holder.
FIGS. 15, 16 and 17 are respectively top, and bottom views of the spring plate of the invention holder.

FIG. 23 is a bottom view of the invention holder of FIG. 1 showing in broken line a cutaway edge.

FIG. 24 is a top view of a cell phone case with an opening to receive into a mating cutout the top portion of the invention holder of FIG. 23.

FIG. 25 is the section 40a of FIG. 24.

FIG. 26 is the holder of FIG. 23 mated to the opening in the cell phone case of FIG. 24.

FIG. 27 is a side view of the assembly of FIG. 26 with a cell phone secured in the cell phone case to thereby secure the invention holder to a floor of the cell phone case and to present to the rear of the cell phone and cell phone case assembly the holder portion of the invention holder.

FIG. 35 is a top view of an narrow embodiment of the invention holder having embedded in its latch plate a housing supporting the visible touch screen display, which housing and touch screen display are electrically connected to circuits and a microprocessor in the housing to comprise the functions of a typical smart watch, which is operable by itself or in wireless communication with a cell phone.

FIG. 36 is a top view of the latch plate of FIG. 1 separated from the invention holder only for purposes of showing that the smart watch of FIG. 35 may also be incorporated into all the forms of the latch plate of the invention holder.

FIG. 37 is a diagram of the invention holders of FIGS. 35 and 36 in wireless communication with a cell phone, which is wireless communication with a cell tower.

FIG. 38 is a high-level diagram of the holder/watch embodiments of FIGS. 35-37 in wireless communication with a cell phone.

FIG. 42 shows a lever adapted to hold a battery.

FIG. 43 shows the lever of FIG. 42 mounted on a spring plate.

FIG. 44 shows a power supply cable used with the battery and lever of FIG. 42.

DETAILED DESCRIPTION OF THE INVENTION

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Embodiments of the present invention include a clip or invention holder, a clip or invention holder which is a pocketable device, and a pocketable device including a clip or invention holder.

Figure 1:
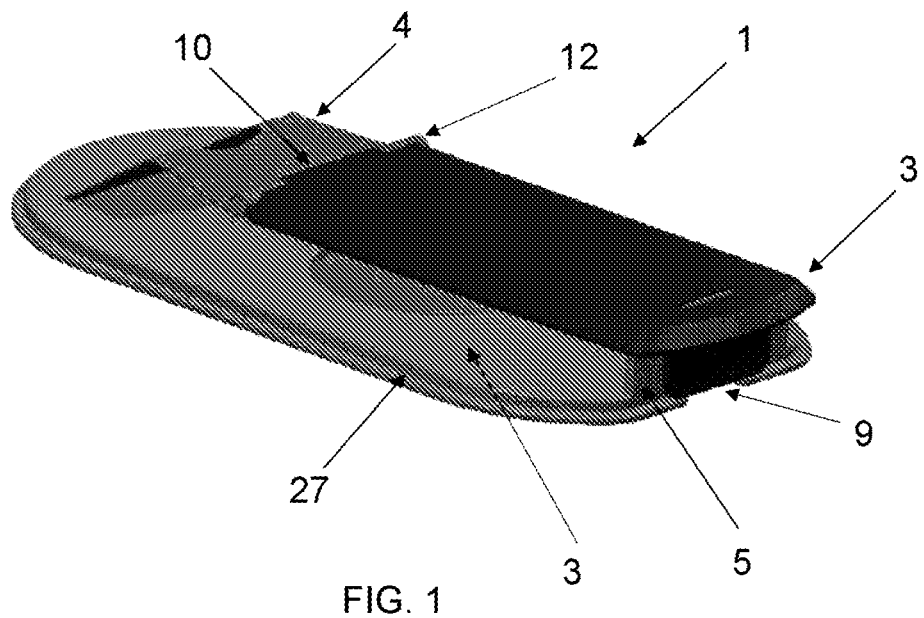
FIG. 1 is a top perspective view of the invention holder in a closed position.
Figure 2:
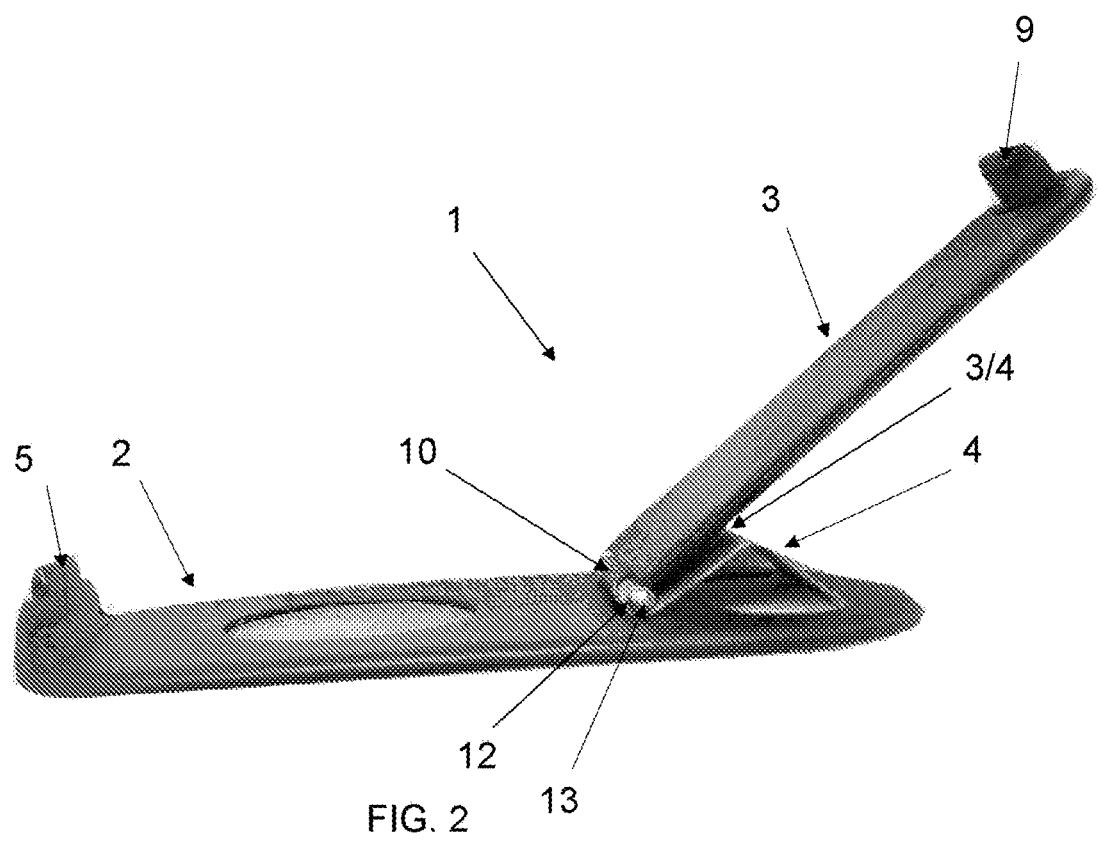
FIG. 2 is a side perspective view of the invention holder.

FIG. 1 is a top perspective view of the invention holder 1 in a closed position showing a bottom plate 2, a latch plate 3 and a spring means 4, where spring means 4 connects to latch plate 3 at a pinned hinge connection comprising cylinder 10 at a first end of latch plate 3 and two aligned pin cylinders 12 with a straight metal pin 13 providing a pivot that allows latch plate 3 to rotate about cylinder 10 from the closed position shown in FIG. 1 to the open position shown in FIG. 2. Latch plate 3 comprises a second end with a downward latch piece 9 which releasably latches to latch piece 5 extending up from bottom plate 2. Spring means 4 comprises a V-shape of a flat plate of spring steel, with two pin cylinders forming a distal edge at the contact portion, where the distal edge is strongly urged against a top surface of the bottom plate 2 by way of connection of a proximal edge 4a being non-rotatably fixed relative to the plane of bottom plate 2. The V-shape of spring means 4 causes the contact portion to press strongly against the top surface of bottom plate 2 at the distal edge because of the fixing of the proximal edge structurally to the plane of the bottom plate 2. In a one embodiment of spring means 4 shown in FIGS. 1 and 2, a spring plate secures the proximal edge of spring means 4, where after the spring plate is inserted into a body slot formed in bottom plate 2 as described below.

It will clear from this description that there are many ways in which the connection of a proximal edge 4a being non-rotatably fixed relative to the plane of bottom plate 2 may be accomplished. One such manner is described below, i.e., the bottom plate is formed from a single metal plate and the proximal edge 4a being non-rotatably fixed relative to the plane of bottom plate 2 by way of welding said proximal edge 4a. Another such method may be to provide a metal or other extension from proximal edge 4a of spring means 4 such that the extension can be fixed by rivets or embedded in bottom plate 2 to accomplish the desired fixing of proximal edge 4a.

In a similar consideration, spring means 4 may be formed of alternate embodiments than a single V-shaped thin plate of spring steel. For example the spring may have a curved shape. For example the spring may have a curved shape such as a semi-circular shape or near semi-circular shape. For example, the spring may be a coil spring with ends that trace out a "V" shape. For example, the spring may be a coil spring with ends that trace out a near semi-circular shape. For example the spring may be a nearly flat or flat spring.

In a particular alternative spring embodiment, spring means 4 may be formed using two plates equivalent to sections 4b. These plates can be joined by a spiral spring to accomplish the desired function of having a generally V-shape spring means, a distal side of which is contacted with an upper surface of latch plate 3 to accomplish the objects of the invention to lift the contact portion of spring means 4 upward from the top surface of bottom plate 2.

FIG. 2 shows that an interface 3/4 is formed between a top surface of latch plate 3 and a lower part of the V-shape spring of spring means 4. One of the disadvantages of the prior art with respect to spring means provided for holding credit cards and bills is that the user lacks lever assistance to open the spring means. In the present invention, FIG. 2 shows that a user continuing the rotation of the latch plate 3 about the pivot hinge connection formed with spring means 4 that the distal edge of spring means 4 will be lifted off its urged position against a top surface of bottom plate 2 by way of the mechanical advantage provided by turning a plate that latches to secure credit cards and bills on the top surface of bottom plate 2 in place into a lever for lifting the contact portion of spring means 4 away from the top surface of bottom plate 2 so that credit cards and bills can easily be inserted without fighting against the spring means 4 to cause that insertion. FIGS. 3 to 9 show the invention holder performing those steps.

Figure 3:
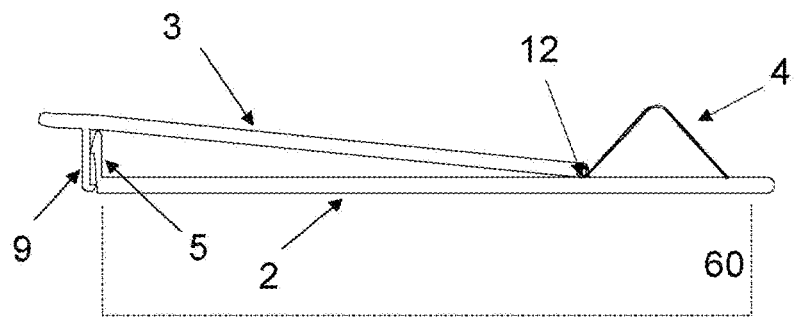
FIG. 3 is side view a side perspective view of the invention in FIG. 1.

FIG. 3 is side view a side perspective view of the invention holder 1 in FIG. 1 showing latch plate 3 engaged by latch piece 9 to latch piece 5 of the bottom plate 2. The contact portion of spring means 4 is shown at cylinders 12 being urged against a top surface of bottom plate 2. Broken lines 60 indicate that a sealable coin purse can be fixed to a bottom surface of bottom plate 2.

Figure 4:
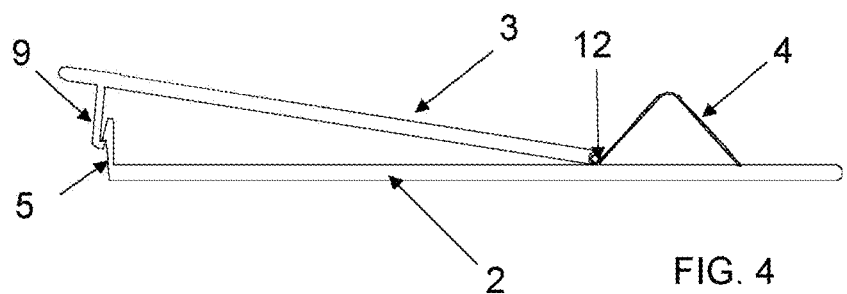
FIG. 4 is the holder of FIG. 3 with a latch plate lifted to a latching notch.

FIG. 4 is the holder 1 of FIG. 3 with a latch plate 2 lifted to latching notches of latching pieces 9 and 5.

Figure 5:
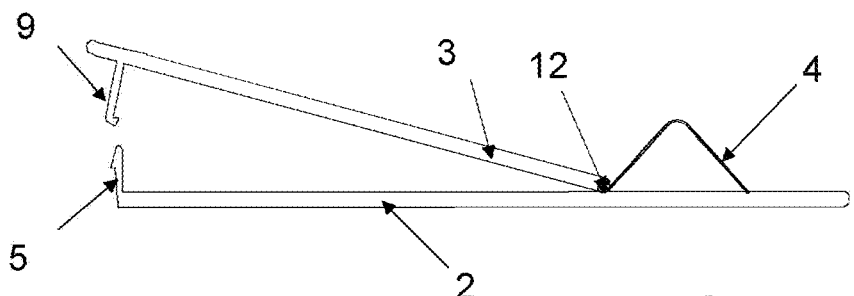
FIG. 5 is the holder of FIG. 4 with the latch plate free of a latch.

FIG. 5 is the holder 1 of FIG. 4 with the latch plate 3 having its latching piece 9 free of a latch engagement with latching piece 5.

Figure 6:
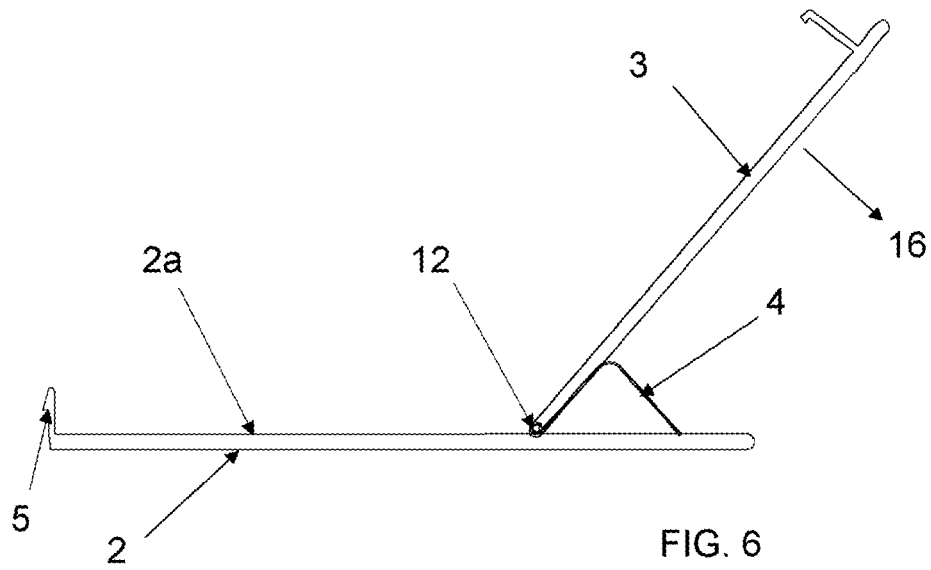
FIG. 6 is the holder of FIG. 5 with the latch plate moved to the open position shown in FIG. 2.

FIG. 6 is the holder 1 of FIG. 5 with the latch plate 2 moved to the open position shown in FIG. 2, where a user presses upon latch plate 2 in direction 16 to cause the contact portion of spring means 4 to lift from the top surface of bottom plate 2.

FIG. 7 is the holder 1 of FIG. 6 with the latch plate pressed in a spring opening direction 16a and a top end of bottom plate 2 pressed in direction 16b so that credit cards 18 and bills 17 can be inserted between a bottom plate and the contact portion of spring means 4. Note that credit cards 18 and bills 17 are insertable upon and are support upon the top surface of the bottom plate 2 without interference with the contact portion of spring means 4. This position of the invention holder 1 is also the position from which credit cards 18 and bills 17 can be easily removed from the invention holder 1. In another embodiment of the latch that connects the latch plate 3 to bottom plate 2, pieces 5 and 9 may have mating, relatively vertical notches similar to the to those shown in FIG. 7 so that an underside of latch plate 3 is fixed closer to a top surface of cards 17 or bills 18.

Referring again to FIG. 7, note that with latch plate 3 in the entirely open position, credit cards cannot slide inadvertently to the left and out of the holder. They cannot slide out of the holder to the right or upwards because spring means 4 bars that movement. Flexible bills 17 can easily be lifted upward and be removed in a direction into or out of the drawing figure, i.e., from the sides of the holder, for easy access while eliminating the potential of sliding out to the left or right.

FIG. 8 is the holder 1 of FIG. 7 with the latch plate 3 released and returned in path 19 to the partly latched position of FIG. 4. When latched, the latch plate (upper jaw) may pivot about pin 99 such that the upper jaw can move through an angle α.

FIG. 9 is the holder of FIG. 8 with the latch plate 2 returned to the fully closed position of FIG. 1. This position provides dual security. First, the contact portion of the spring means 4 is strongly pressed upon a top surface of the credit cards 18 and bills 17 to secure them to the top surface of bottom plate 2 and latch plate 3 covers the top surface of credit cards 18 and bills 17 and creates a latched space between the underside of latch plate 3 and a top surface of bottom plate 3 within which the credit cards 18 and bills 17 are held securely.

Figure 10:
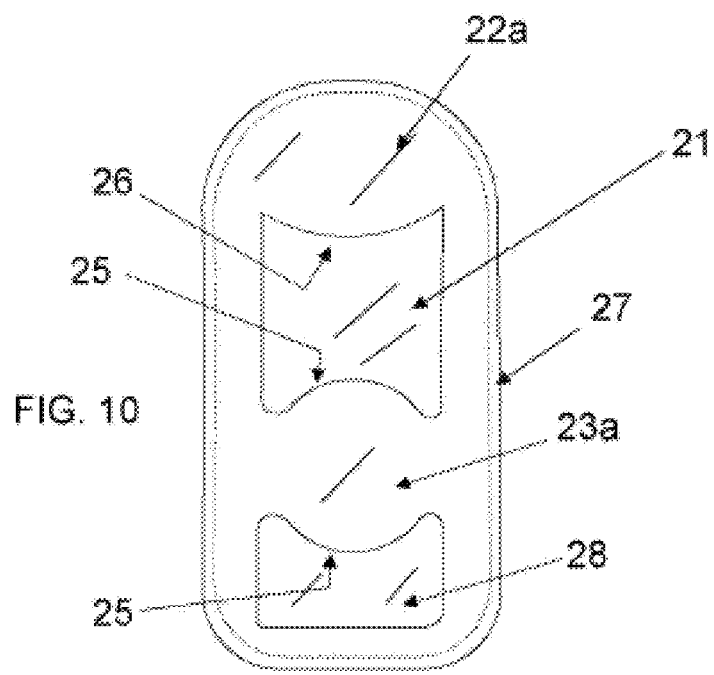
FIGS. 10 and 11 are respectively a bottom view and top perspective view of the bottom plate of the invention holder.
Figure 11:
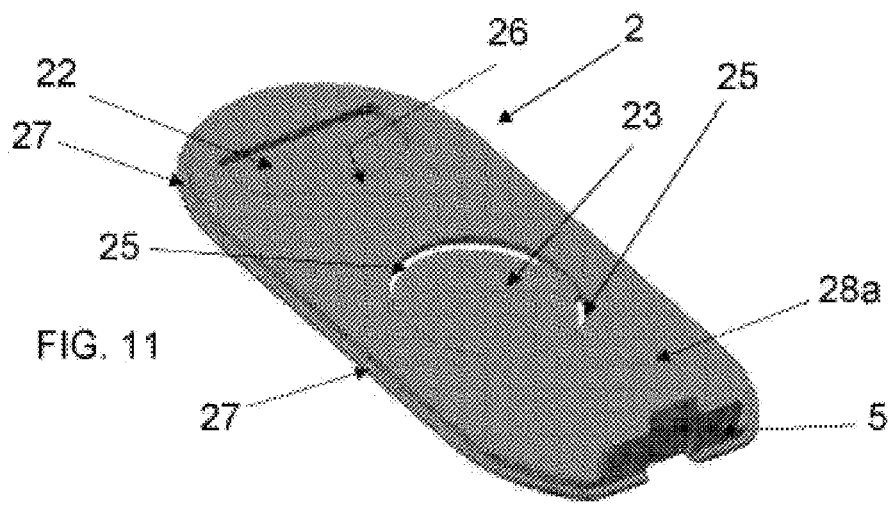

FIGS. 10 and 11 are respectively a bottom view and top perspective view of the bottom plate 2 of the invention holder 1, where bottom plate 2 is provided with an original thickness 3a (FIG. 12) into which are formed impressions and slots to provide a means for insertion and securing of a spring plate 30 (FIGS. 15-17) to which the proximal end 4a of spring means 4 is fixed, thereby forming a non-rotatable connection between a proximal edge of spring means 4 and a plane of the bottom plate 2.

Impressions 21 and 28 (with opposite sides respectively of sections 21a and 28a) are formed in an underside of bottom plate 3 that mate to and connection with impressions 22 and 23 (with opposite sides respectively of sections 22a and 23a ) by way of slots 25 and 26. This arrangement of slots and impressions provides that a flat steel plate can be inserted in slog 26 in direction 29a, continued to be inserted through slots 25 in direction 29b, and then extended into impression 28 in direction 29c. After taking that action a flat metal plate will be seated firmly into bottom plate 2 for the secure location for the proximal end of spring means 4.

Figure 12:
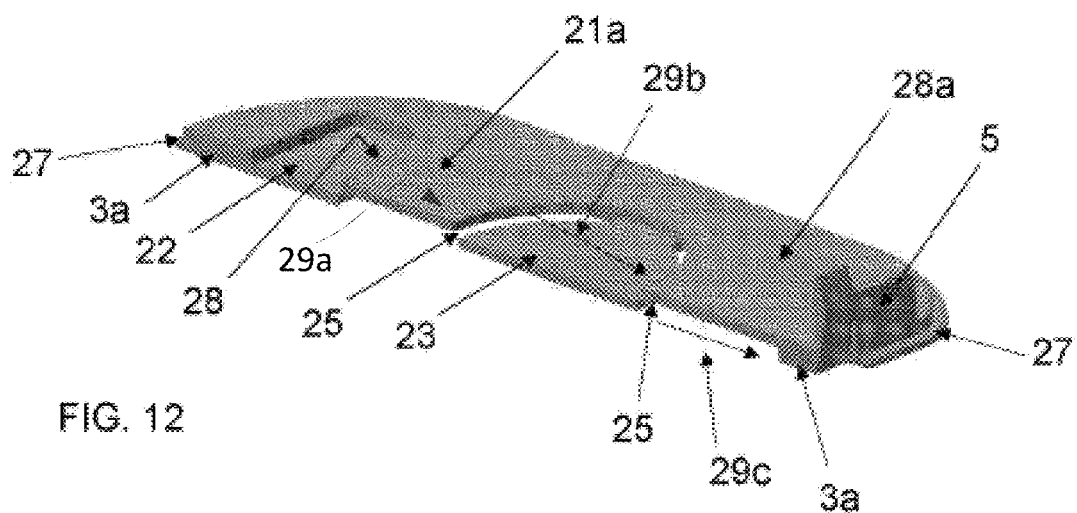
FIG. 12 is the bottom plate of FIG. 11 shown in cutaway view so that insertion slots for a spring plate are shown.
Figure 18:
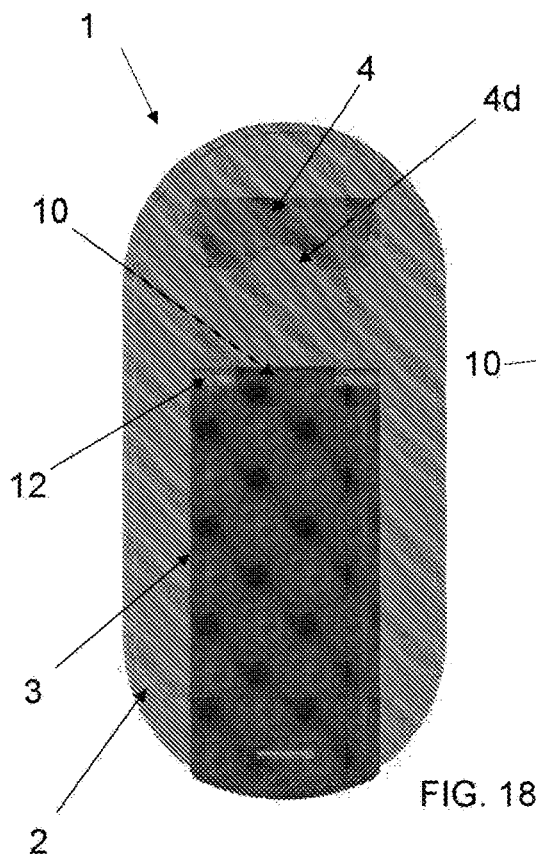
FIGS. 18, 19, 20, 21 and 22 are respectively the holder of FIG. 1 shown in top view, top perspective view, end view, bottom slanted view and bottom perspective view.
Figure 19:
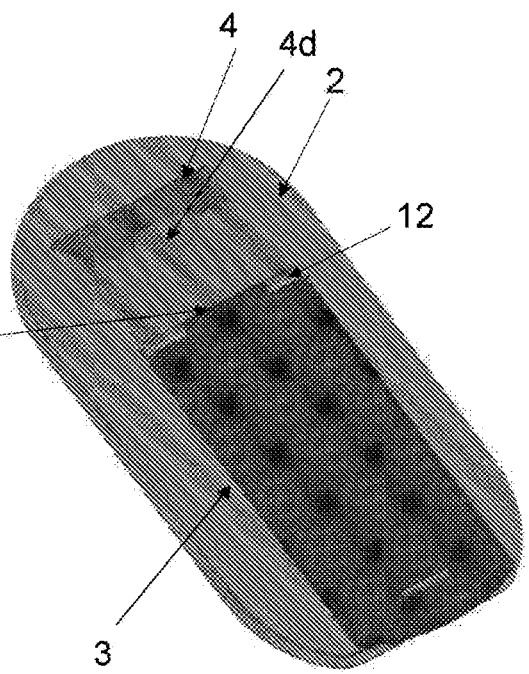
Figure 20:
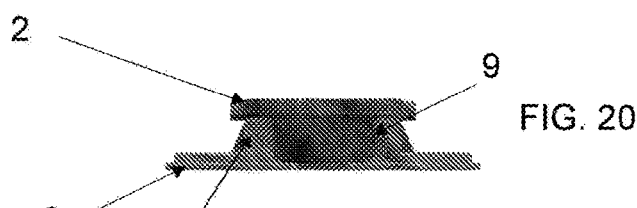
Figure 21:
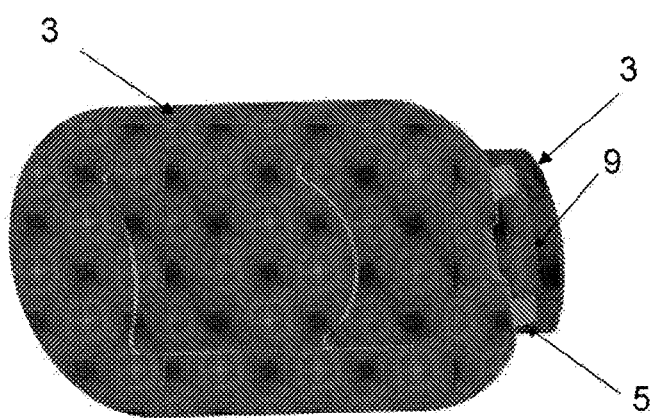
Figure 22:
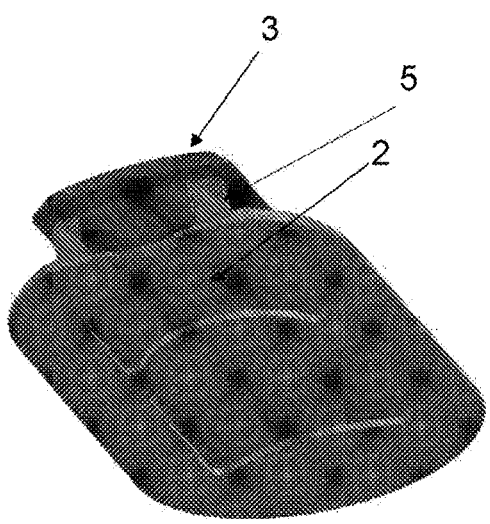

FIG. 12 is a cross-section of FIG. 11.

FIGS. 13 and 14 are respectively top and side views of the latch plate 3 of the invention holder, having a solid body 3a preferably of polymer. More preferably, the polymer of body 3a comprises carbon fiber or appropriate metal so that, in combination with a spring plate located in bottom plate 2, credit card secured in the invention holder shall not be capable of being hacked by near field communications due to metallic interference provided by the spring plate and the content of body 3a. This is commonly referred to as RFID protection.

FIGS. 15, 16 and 17 are respectively top, and bottom views of the spring plate 30 of the invention holder, where spring means 4 comprises proximal and distal sides 4b of the V-shape, cylinders 12 at a contact portion, and a proximal edge 4a which is fixed to a top edge of a flat metal plate 31, which is adapted to be inserted into the arrangement of impressions and slots of the bottom plate as described above.

An opening 4d is provided so that a cell phone embodiment of the invention allows a user to insert a side or tip of a forefinger to provide support when a user is making a cell phone call.

FIGS. 18, 19, 20, 21 and 22 are respectively the holder 1 of FIG. 1 shown in top view, top perspective view, end view, bottom slanted view and bottom perspective view.

FIG. 23 is a bottom view of the invention holder of FIG. 1 showing in broken line a cutaway edge of bottom plate 3.

FIG. 24 is a top view of a cell phone case 40 with a floor 42 and sidewalls 41 with an opening 44 and a mating ledge 43 to receive the top portion of the invention holder 1 of FIG. 23. FIG. 25 is the section 40a of FIG. 24 showing a mating ledge 43 and opening 44. A periphery of opening 44 may alternately be provided with convex or concave surface so that an outer edge of bottom plate 2 may be formed respectively in a concave or convex shape to snap fit into case 40. Further, said periphery can be rounded and provided with an elastomer surface for securely engaging an outside edge of bottom plate 2.

FIG. 26 is the holder 1 of FIG. 23 mated at interface 27/43 to the opening in the cell phone case 40 of FIG. 24.

FIG. 27 is a side view of the assembly of FIG. 26 with a cell phone (not shown but entirely encased in the case 40) secured in the cell phone case 40 to thereby secure the invention holder 1 to a floor of the cell phone case 40 and to present to the rear of the cell phone and cell phone case assembly the holder portion of the invention holder 1 so that credit cards 18 and bills 17 can be secured to a backside of a user's cell phone.

Figure 28:
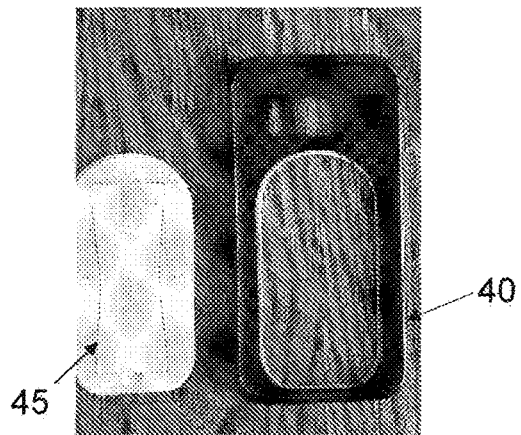
FIG. 28 shows the cell phone case of FIG. 24 and a top view of an insert to replace the invention holder as shown in FIG. 26.

FIG. 28 shows the cell phone case 40 of FIG. 24 and a top view of an insert 45 to replace the invention holder 1 as shown in FIG. 26.

Figure 29:
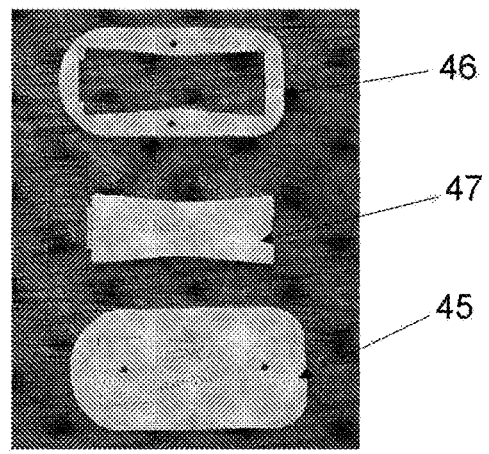
FIG. 29 is a top view of the insert of FIG. 28 and also separated into a base and extendable plate.

FIG. 29 is a top view of the insert 45 of FIG. 28 and also separated into a base 46 and extendable plate 47.

Figure 30:
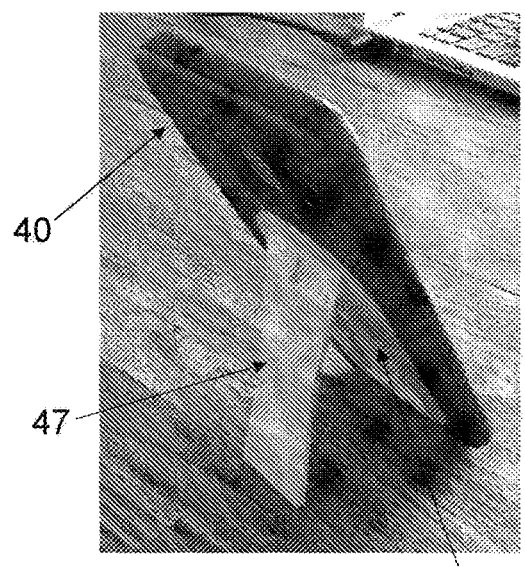
FIG. 30 is the cell phone case and cell phone of FIG. 27 shown supported from the extendable plate of the insert of FIG. 29.

FIG. 30 is the cell phone case 40 and cell phone of FIG. 27 shown supported from the extendable plate 47 of the insert 45 of FIG. 29, where the extendable plate at a lower free edge has incorporated into it a surface material of elastomer with a high coefficient of friction to resist sliding on a smooth surface and a limitation of rotation away from the backside of the cell phone case to 90 degrees or less.

Figure 31:
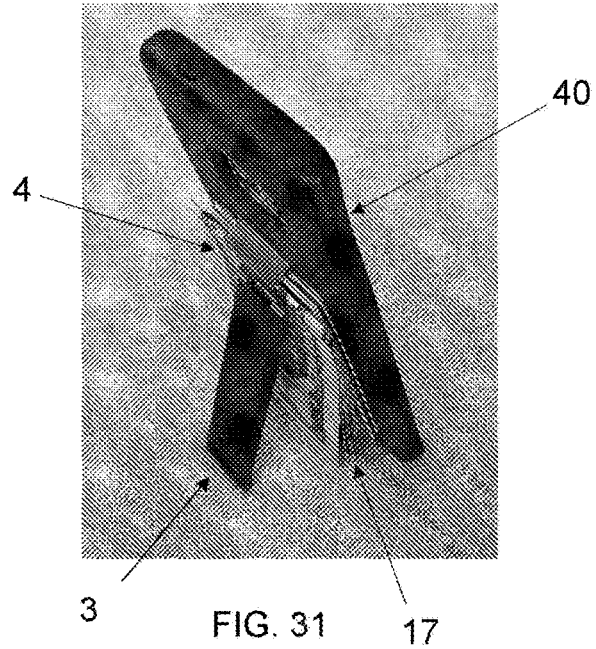
FIG. 31 is the assembly of FIG. 27 shown with the latch plate unlatched to provide a support similar to that provided by the extendable plate of the insert of FIG. 30.

FIG. 31 is the assembly of FIG. 27 shown with the latch plate 2 unlatched to provide a support similar to that provided by the extendable plate 47 of the insert 45 of FIG. 30.

Figure 32:
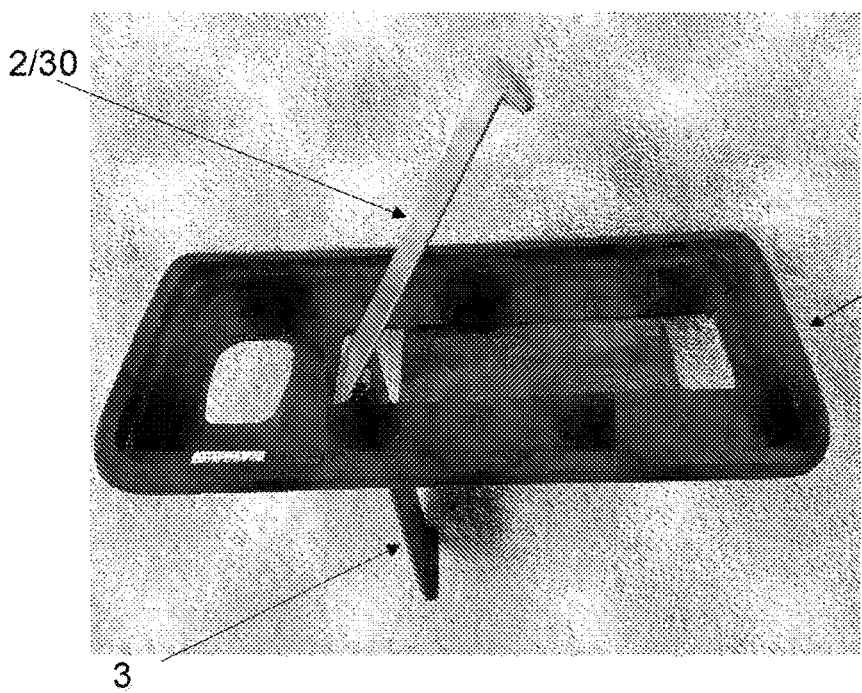
FIG. 32 is an alternate embodiment of the invention holder and cell phone case of FIG. 26, where, in a top perspective view, a combined bottom and spring plate is adapted to incorporate the structure and function of the spring plate and bottom plate and the cell phone case is provided with two openings to receive the combined bottom and spring plate.

FIG. 32 is an alternate embodiment of the invention holder and cell phone case of FIG. 26, where, in a top perspective view, a combined bottom and spring plate 2130 is adapted to incorporate the structure and function of the spring plate 30 and bottom plate 2 and the cell phone case 40' is provided with two openings to receive the combined bottom and spring plate.

Figure 33:
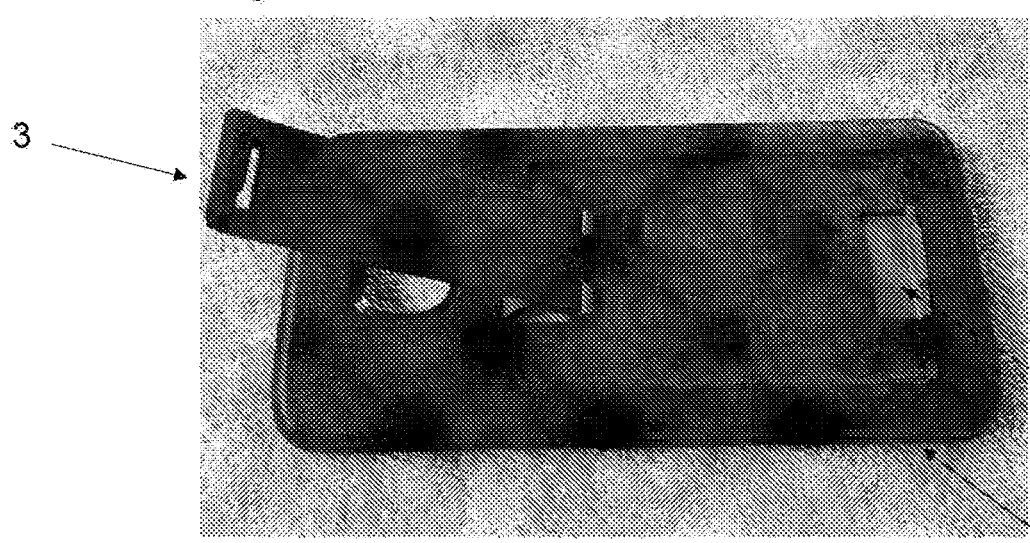
FIG. 33 shows the assembly of the holder of FIG. 32 with the combined bottom and spring plate fixed in the openings of the cell phone case.

FIG. 33 shows the assembly of the holder of FIG. 32 with the combined bottom and spring plate 2/30 fixed in the openings of the cell phone case 40'. This embodiment also comprises a complementary piece similar to insert 45 of FIG. 29 which adapted to cover the openings in case 40' when the invention holder shown in FIG. 33 is taken apart from case 40'.

Figure 34:
FIG. 34 shows the embodiment of the holder of FIG. 32 in rear perspective view with that holder engaged with the cell phone case and retaining bills and credit cards with the latch plate unlatched to provide support similar to that of the extendable plate of FIG. 30.

FIG. 34 shows the embodiment of the holder of FIG. 32 in rear perspective view with that holder engaged with the cell phone case 40' and retaining bills and credit cards 17 with the latch plate 3 unlatched to provide support similar to that of the extendable plate of FIG. 30.

FIG. 35 is a top view of an narrow embodiment of the invention holder, having a narrow bottom plate 2 narrow and a narrow latch plate 3 narrow having embedded in its latch plate a housing supporting the visible touch screen display 52, which housing and touch screen display are electrically connected to circuits and a microprocessor in the housing to comprise the functions of a typical smart watch, which is operable by itself or in wireless communication with a cell phone.

FIG. 36 is a top view of the latch plate of FIG. 1 separated from the invention holder only for purposes of showing that the smart watch of FIG. 35 may also be incorporated into all the forms of the latch plate of the invention holder, but that display 52 can be increased in size in directions 55 and protected from contact with spring means 4 in section 54 by way of a spacer post or flange so the display 52 does not contact spring means 4.

FIG. 37 is a diagram of the invention holders of FIGS. 35 and 36 as holder/watch in wireless communication with a cell phone C1, which is wireless communication with a cell tower.

FIG. 38 is a high-level diagram of the holder/watch embodiments of FIGS. 35-37 in wireless communication with a cell phone. The cell phone comprises a standard touch screen or similar display and pressure sensitive button interface operating under a control program of the microprocessor MP and having means for wireless communication by cellular, WiFi, and Bluetooth standards.

The holder/watch comprises similar operating under a control program of the microprocessor MP and having means for wireless communication by Bluetooth {or other appropriate) standard with the cell phone. The holder/watch may operate independently {free from communications with the cell phone) or dependently (in communication with the cell phone) to perform all functions of current smart watches, such as notification by sound or vibration of receipt of emails or messages or alarms that occur at the cell phone, tracking of GPS coordinates for fitness, display of data at the holder/watch of data transmitted from the cell phone, such as results of operation of software or apps on the cell phone.

Figure 39:
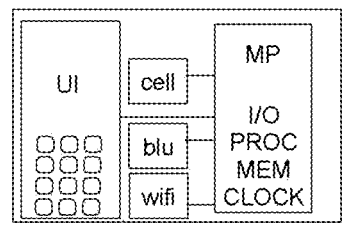
FIG. 39 is a high-level diagram of the holder embodiments of FIGS. 35-37 incorporating a cell phone into the latch plate.

FIG. 39 is a high-level diagram of the holder embodiments of FIGS. 35-37 incorporating a cell phone into the latch plate, where, instead of smart watch a cell phone is provided within the supporting housing described above.

Figure 40:
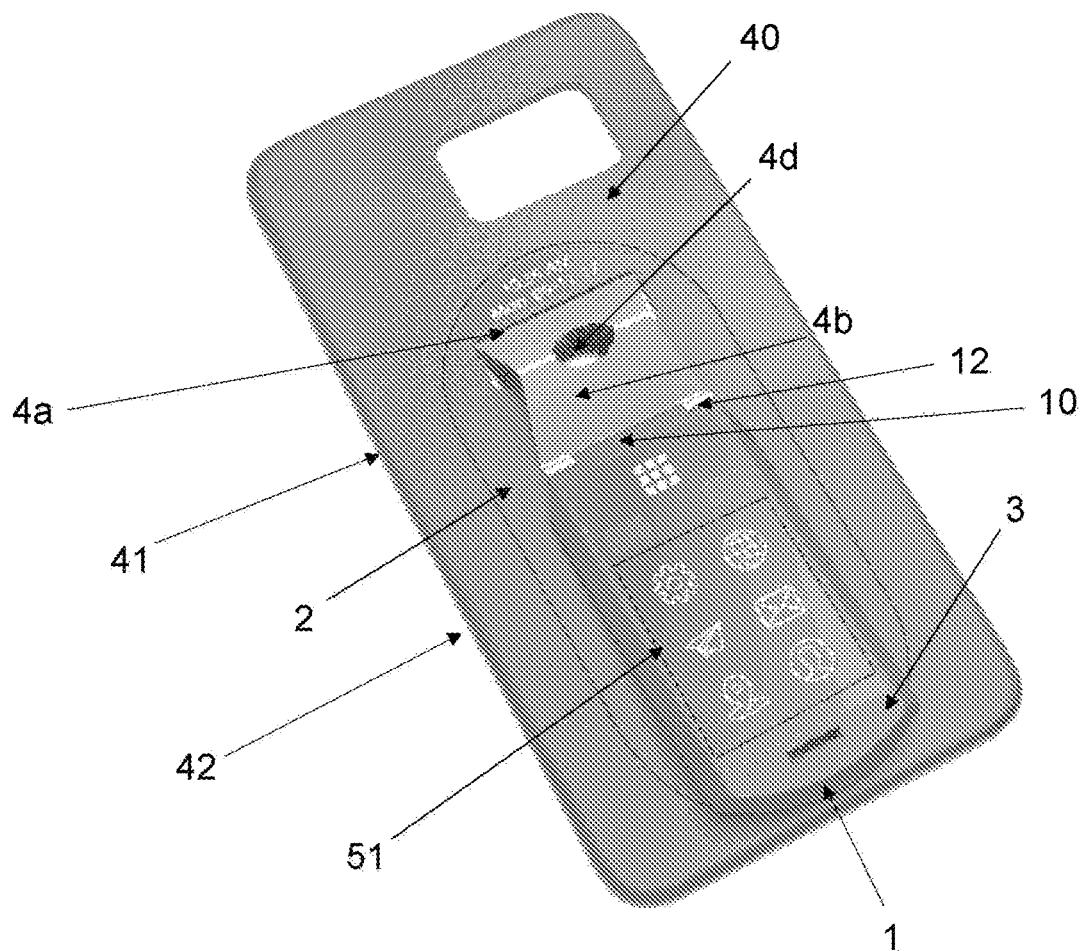
FIG. 40 is a rear perspective view of a rectangular cell phone case as in FIG. 24 further showing incorporation of the holder 1 into such a cell phone case.

FIG. 40 is a rear perspective view of a rectangular cell phone case as in FIG. 24 further showing incorporation of the holder 1 into such a cell phone case. The broken line outline shows a general surface area in which the form factor of the invention smart watch 51 can be incorporated into the invention holder. Power for cell phones is typically provided by a battery of substantial size relative to the form factor of the rest of the circuits, so that it will be preferred that a bottom plate of the invention holder is adapted to contain the powering battery for the cell phone (or smart watch embodiment) with appropriate wiring and electrical connection made between the latch plate and the bottom plate.

Incorporation of smart watch functionality into the invention holder of currency or credit cards is an improvement in some ways over wearing a watchband with a housing and touch screen to accomplish the same functions. A user need not endanger the sensitive components on a wrist and instead carry the holder/watch in their pocket with valuable credit cards and cash. The fitness aspect of the smart watch is more accurate, in that it does not record actions of the arm of a user, only actual full body movements.

It will be understood that the breadth of the invention concept of incorporation of a credit card holder or bill clip that extends outward from a surface of a support plate of a rectangular removable cell phone case is not limited by the specific description, i.e., any credit card or bill clip or holder with a substantial flat surface of a support plate supporting the clip or holder outward from that flat surface can be adapted using the present description to be fixed in a plate such as bottom plate 2 or otherwise glued or fixed to the backside of a cell phone case as described herein.

It will be further understood that the breadth of the invention concept of incorporation of smart watch with the invention holder extends to any card holder or bill clip that extends outward from a surface of a support plate and adapting said support plate to sufficient width and structural depth to secure in said support plate a housing and circuits of a touch screen smart watch. For instance, said smart watch can be incorporated into bottom plate 2 or into latch plate 3 by way of the above description.

The above described prior art clips may be adapted to incorporate a smart watch by way of the present description as well, by way of thickening support plates from which extends clips or similar structural features to capture credit cards or bills.

Figure 41:
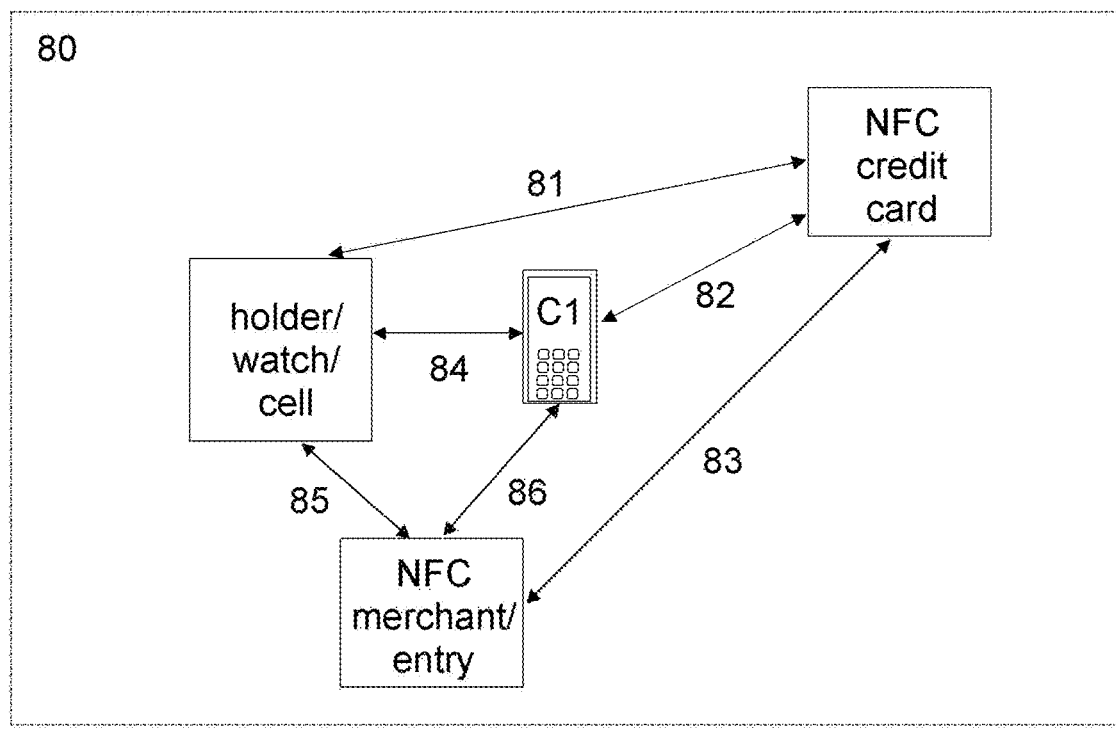
FIG. 41 is a high-level diagram of a credit card or bill holder of any construction incorporating the microprocessor devices of FIGS. 35-39 and communicating wirelessly directly or indirectly with a near field communication enabled credit card or where said near field near field communication enabled credit card secured in said holder wirelessly communicates with a cell phone.

FIG. 41 is a high-level diagram of a security system 80 having additional and virtually un-hackable levels of security for transactions conducted involving a near field communication enabled credit card NFC credit card and a wireless communication between the NFC credit card and an near field communication enabled authorization device NFC merchant/entry. The following is a description of the relevant technology to the security system 80.

Near field communication (NFC) devices provide easily transportable access to payment for and/or provider-delivery of goods and services by way of secure integrated circuits (or their functional equivalent) incorporated into handheld items, some as small as paper tickets, brought into close proximity of a NFC reader device. In cases, advanced security against mis-use of NFC devices and readers may be available. Security in digital systems may balance hardware requirements, computing power, memory, and permissible time required for computation of access, transmissions, and security algorithms. In some cases, time is a critical limitation for a security system controlling consumer purchases. For example, consumers may be intolerant of time delays in making purchases or obtaining goods or services by way of digitally secure transactions.

Portable and handheld computing devices may include substantial processing capabilities and where combined with near field communication capabilities for concluding local transactions they provide important additions to consumer methods of purchasing. Such devices may include mobile communications devices enabled with near field communication (NFC) capability for making financial transactions and transacting sales at POS terminals of transaction offering entities (such as mobile cellular telephones, WiFi enabled data devices, such as the iTouch, iPhone and iPad), mobile computer tablets, and laptop computers enabled for cellular communication) (referred to herein as Enabled Devices).

Enabled Devices may have a microprocessor comprising a CPU, memory, and input/output circuits operating under a control program or programs for effective connections to wireless communication components and a local user interface to accomplish wireless communications between an Enabled Device and a remote correspondent.

A remote correspondent may be a wireless communications device across a table from a user of an Enabled Device in a direct peer to peer communication session. A remote correspondent may also be a credit card server system across the globe from a user of an Enabled Device, where the Enabled Device wirelessly communicates with a cellular communication tower or link and thereafter is routed to an Internet connection to the credit card server system for an indirect communication session.

Further, a remote correspondent may be a local sales processing computer server system in a store where a user of an Enabled Device directly wirelessly communicates with a local NFC reader, which in turn in linked with a sales processing sales computer system of the merchant store. As used herein, a remote correspondent comprises any of those recipients or transmitters of voice or data that are capable of communicating directly or indirectly with an Enabled Device. These specific examples of remote correspondents are not intended to be limiting as to the definition of a remote correspondent.

NFC user smartcard architecture combines coprocessors for security protocols RSA, ECC, DES and AES and enables implementation of operating systems including Java Open Platform and MULTOS. However, functions carried out by processor circuits of an NFC user card can be incorporated into processor circuits of appropriately modified or more capable computer chips and processors.

While many advanced security and encryption methods are available in the art, those security methods which meet the requirements of NFC device and readers actually used are limited by well-known industry standards and handheld device capabilities and structures. Presently, a further limitation of handheld devices may occur where an NFC communication includes use of a mobile or wireless communication device (including, without limitation, a cellular phone or WiFi enabled handheld device).

As described in US Patent Application Publication 2010/0205432 (Title: METHOD, SYSTEM, TRUSTED SERVICE MANAGER, SERVICE PROVIDER AND MEMORY ELEMENT FOR MANAGING ACCESS RIGHTS FOR TRUSTED APPLICATIONS; Ser. No. 12/679874; Filed: Sep. 20, 2008), which is incorporated herein by reference, "Mobile NFC" combines a secure NFC user card or its equivalent and a mobile telephone or similar handheld device. This provides long range wireless communication of NFC voice or data.

NFC user card functionality can be incorporated into a mobile telephone by way of the UICC (Universal Integrated Circuit Card), a removable integrated circuit or card used in mobile phones in GSM, UMTS and similar networks. Such a device must be NFC capable, such as supporting SWP (single wire protocol), to use UICC which provides storage of credit card credentials.

We turn now to a description of the invention security system 80. The remote correspondent of the above corresponds to the NFC merchant/entry aspect of FIG. 41. It should be noted that NFC security is weak where the interception of wireless signals between the NFC credit card and the NFC merchant/entry allow for mis-use by an intercepting device/user.

Mitigating this weakness, embodiments of applicant's system provide an additional level of confirmation security to the wireless transactions. This confirmation security cannot be duplicated by an intercepting device/user.

In the security system 80, NFC merchant/entry device alerts by wireless signals either the (i) invention holder (which in FIG. 40 may be any type of credit card or bill holder or clip with a support plate expanded to incorporate the appropriate microprocessor/interface/NFC enabled device), (ii) the cell phone C1, or (iii) the NFC credit card of its presence and, after appropriate "handshake" signals, requires authorization from one of these before proceeding with authorization of a transaction or entry.

In the invention security system 80, one of several combinations of communications among the devices of FIG. 41 occurs: (1) authorization is required from the NFC credit card and one of either the invention holder or the cell phone C1 according to authorizations required for NFC transactions; (2) authorization is required by the NFC merchant/entry device directly from either the invention holder (which in FIG. 40 may be any type of credit card or bill holder or clip with a support plate expanded to incorporate the appropriate microprocessor/interface/NFC enabled device) or cell phone C1, one of which must obtain a typical NFC authorization wirelessly and directly from the NFC credit card before transmitting an authorization code to the NFC merchant/entry device; or (3) authorization is required by the NFC merchant/entry device directly from either the NFC credit card which must obtain a typical NFC authorization wirelessly and directly from the invention holder (which in FIG. 40 may be any type of credit card or bill holder or clip with a support plate expanded to incorporate the appropriate microprocessor and interface) or cell phone C1.

In any of these three security system embodiments, mere duplication of the communicated authorization signal to the NFC merchant/entry device cannot accomplish the transaction. Only interactive communication with (i) the invention holder, which holds the NFC credit card, or (ii) the cell phone C1 and the NFC credit card can accomplish the transaction. This is because the authorization required by the NFC merchant/entry device is a two step authorization depends upon (1) an NFC credit card code and (2) one of an (i) invention holder or (ii) cell phone code.

Security system 80 allows for concluding a sale or for authorized entry into a secure building, said card or bill holder of any construction incorporating the microprocessor devices of FIGS. 35-39 and communicating wirelessly directly or indirectly with a near field communication enabled credit card or where said near field near field communication enabled credit card secured in said holder wirelessly communicates with a cell phone.

Turning now to embodiments of the currency and credit card holder with alternate latch plates or upper jaws, reference is made to FIGS. 42-45.

Similar to the latch plates/upper jaws described above, FIG. 42 shows a rectangular upper jaw 300 in plan 331 and profile 332 views. However, this upper jaw includes a pocket or depressed area 302 in its surface 304. The pocket 302 is for receiving a battery, NFC chip, storage device, or the like 320.

FIG. 43 shows the upper jaw 300 of FIG. 42 which accommodates the battery and/or an NFC chip 320 in the pocket 302. The battery and/or NFC chip may be removable. The upper jaw is mounted to a spring plate or lower jaw 350 that is similar to the spring plates described above. In various embodiments the lower jaw is rectangular and/or substantially flat.

FIGS. 43-44 show one end of a "V" shaped spring 341 is anchored to the lower jaw 350 near an end of the lower jaw 354. The other end of the spring includes a hinge part 316 (see FIG. 44) that is biased toward the lower jaw 350. Hinge 312 includes parts 314 and 316 (see FIG. 44) and hinge part 316 rotatably connects with mating hinge part 314 at one end of the upper jaw 300. For example, a pinned hinge may be used where a pin (not shown) is inserted through hinge parts 314 and 316 to rotatably fix the upper jaw to the lower jaw.

In FIG. 44 the upper jaw 300 is shown above the lower jaw 350 before the hinge parts 314, 316 are mated. This view illustrates the location of a power cable such as a ribbon cable 310 which conducts electric power from the battery 320 within the pocket 302 of the upper jaw 300 to a cell phone or other appliance 330 mounted on a side of the lower jaw 350 opposite the spring 307.

The power cable 310 may take various routes between the battery and the cell phone and along these routes may traverse the interior or exterior of the spring 321. For example, the power cable may be routed from the battery 320, through a pocket end wall 319, and around hinge parts 314, 316. The cable may continue along an interior surface of the spring 321 and through a lower jaw hole such as a hole beneath the spring 323. And, the power cable may end at a power connection of the cell phone 325.

Figure 45:
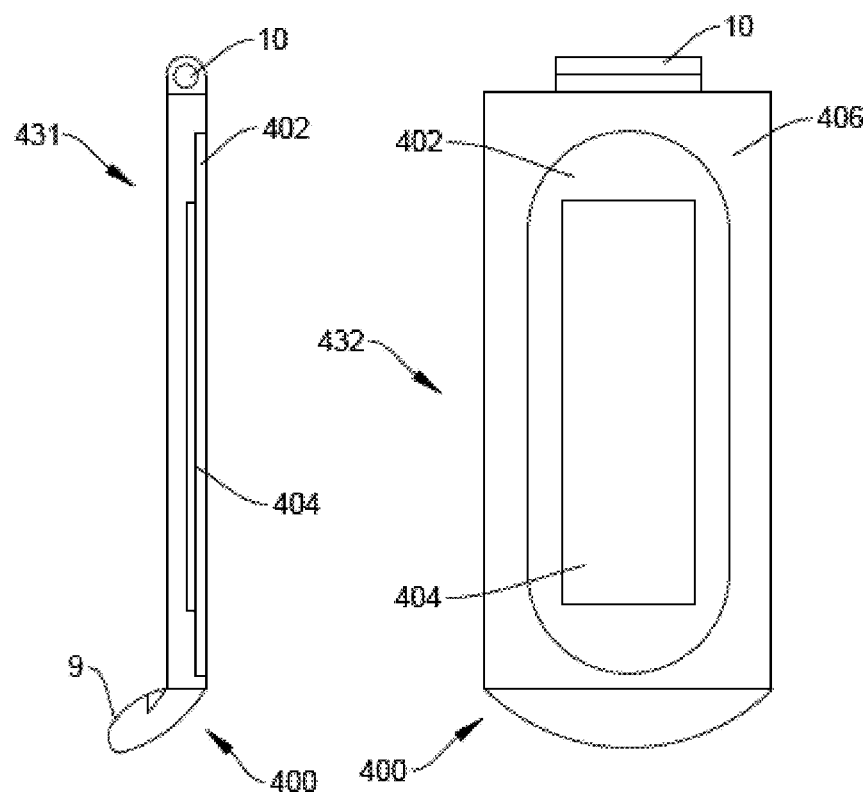
FIG. 45 shows a lever adapted to hold an NFC or Bluetooth device.

In FIG. 45, yet another upper jaw design is similar to the upper jaws described above. As seen, a rectangular upper jaw 400 in presented in plan 431 and profile 432 views. However, this upper jaw includes nested pockets or depressed areas 402, 404 in its surface 406. As shown, pocket 404 is the deepest pocket. Pocket 404 is for receiving an NFC chip and pocket 402 is for receiving an insert or cover such as a natural or manmade fabric, hide, mat, or means of advertising or personalization such as a logo or personalization plate (not shown).

It is to be understood that while certain forms of the present invention have been illustrated and described herein, it is not to be limited to the specific forms or arrangement of parts described and shown.

What is claimed is:

1. A pocketable device comprising:
a mechanical assembly for holding bills and credit cards;
the mechanical assembly including a latch plate or upper jaw and a spring plate or lower jaw, each jaw having a flat, rectangular shape;
a "V" shaped spring having a first end affixed to the lower jaw and a second end biased toward the lower jaw; and,
the upper jaw having a pinned end rotatably connected via a pin to the spring second end and opposite the pinned end a latch end for interengaging a mating latch;
wherein bills and cards placed between the upper jaw and lower jaw are compressed between the spring second end and the lower jaw and wherein when latched the upper jaw is free to pivot about the pin such that the upper jaw can move through an angle of less than 10 degrees and when unlatched the upper jaw is free to pivot about the pin through an angle that widens the "V" of the spring.

2. The pocketable device of claim 1 further comprising:
beyond the spring affixation, a lower jaw extension opposite a lower jaw latch end; and,
a pocketable device configuration wherein the upper jaw is over the extension;
wherein the "V" of the spring is widened when the extension and the upper jaw are squeezed between a person's index finger and thumb.

3. The pocketable device of claim 2 further comprising:
a cell phone integral with the mechanical assembly, the cell phone coupled to the lower jaw; and,
a cell phone battery integral with the upper jaw.

4. The pocketable device of claim 3 wherein a pocket of the upper jaw receives the cell phone battery.

5. The pocketable device of claim 4 further comprising:
a ribbon cable to convey power from the battery to the cell phone; and,
the ribbon cable passing through a pocket end wall 319, around the pinned end, along an exterior surface of the spring, through a lower jaw hole, and to a cell phone power connection.

6. The pocketable device of claim 4 further comprising:
a ribbon cable to convey power from the battery to the cell phone; and, the ribbon cable passing through a pocket end wall 319, around the pinned end, along an interior surface of the spring, through a lower jaw hole, and to a cell phone power connection.

7. The pocketable device of claim 2 further comprising:
the mechanical assembly affixed to a bottom plate via a slot in the bottom plate that receives a free end of the lower jaw; and,
the mating latch formed at an end of the bottom plate.

8. The pocketable device of claim 7 further comprising:
a first pocket in the upper jaw, the first pocket for receiving an NFC device or Bluetooth device.

9. The pocketable device of claim 8 further comprising:
a second pocket in the upper jaw;
the second pocket opening at an upper jaw external surface and within the second pocket the first pocket such that the pockets are nested with a step therebetween; and,
a natural or manmade fabric, hide, mat, logo, or personalization plate covering the first pocket and inset in the second pocket.

10. The pocketable device of claim 7 further comprising:
a card capture zone between the spring and the latch;
the card capture zone bounded at one end by an interior of the spring that extends more than one quarter of a width of the card; and,
the card capture zone bounded at an opposite end by the bottom plate latch that extends more than one quarter of a width of the card.

11. The device of claim 7 further comprising a cell phone case having a front for displaying a cell phone screen and a back for attachment to the bottom plate wherein the upper jaw opens away from the cell phone case.

12. The device of claim 11 wherein the cell phone case back includes an opening for receiving the bottom plate.

13. The device of claim 12 wherein the opening includes a first cut-out and a second-cut out forming a step therebetween such that the bottom plate is compressed when it passes through the first cut-out and expands when it enters the second cut-out.

14. A system for communicating using NFC comprising:
a pocketable device including a mechanical assembly for holding bills and credit cards;
the mechanical assembly including a latch plate or upper jaw and a spring plate or lower jaw, each jaw having a flat, rectangular shape;
a first pocket in the upper jaw, the first pocket for receiving an NFC device;
a "V" shaped spring having a first end affixed to the lower jaw and a second end biased toward the lower jaw; and,
the upper jaw having a pinned end rotatably connected via a pin to the spring second end and opposite the pinned end a latch end for interengaging a mating latch;
an NFC merchant device that wirelessly alerts the pocketable device; and,
the pocketable device causes an NFC card to send its code directly or indirectly to the NFC merchant device thereby avoiding an inquiry and response exchanged between two devices;
wherein bills and cards placed between the upper jaw and bottom plate are compressed between the spring second end and the lower jaw and when latched the upper jaw is free to pivot about the pin through an angle of less than 20 degrees and when unlatched the upper jaw is free to pivot about the pin through an angle that widens the "V" of the spring.

15. A system for communicating using NFC comprising:
a pocketable device including a mechanical assembly for holding bills and credit cards;
the mechanical assembly including a latch plate or upper jaw and a spring plate or lower jaw, each jaw having a flat, rectangular shape;
a first pocket in the upper jaw, the first pocket for receiving an NFC device;
a "V" shaped spring having a first end affixed to the lower jaw and a second end biased toward the lower jaw; and,
the upper jaw having a pinned end rotatably connected via a pin to the spring second end and opposite the pinned end a latch end for interengaging a mating latch;
an NFC merchant device that wirelessly alerts the pocketable device; and,
communication between the pocketable device and an NFC card results in communication from one or both of these devices with the NFC merchant device thereby avoiding an inquiry and response exchanged between two devices;
wherein bills and cards placed between the upper jaw and bottom plate are compressed between the spring second end and the lower jaw and when latched the upper jaw is free to pivot about the pin through an angle of less than 20 degrees and when unlatched the upper jaw is free to pivot about the pin through an angle that widens the "V" of the spring.

* * * * *